Patented Nov. 1, 1932

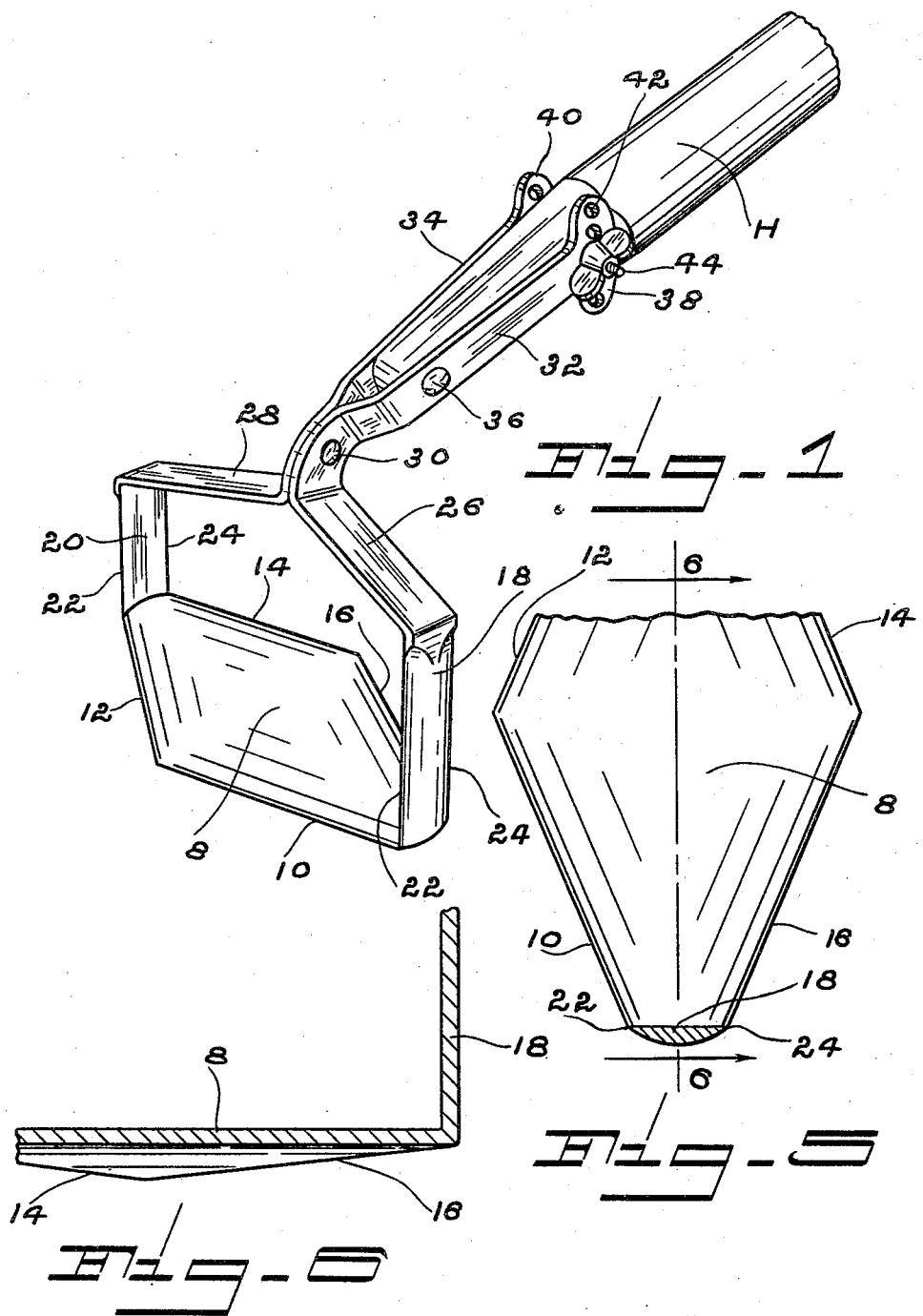

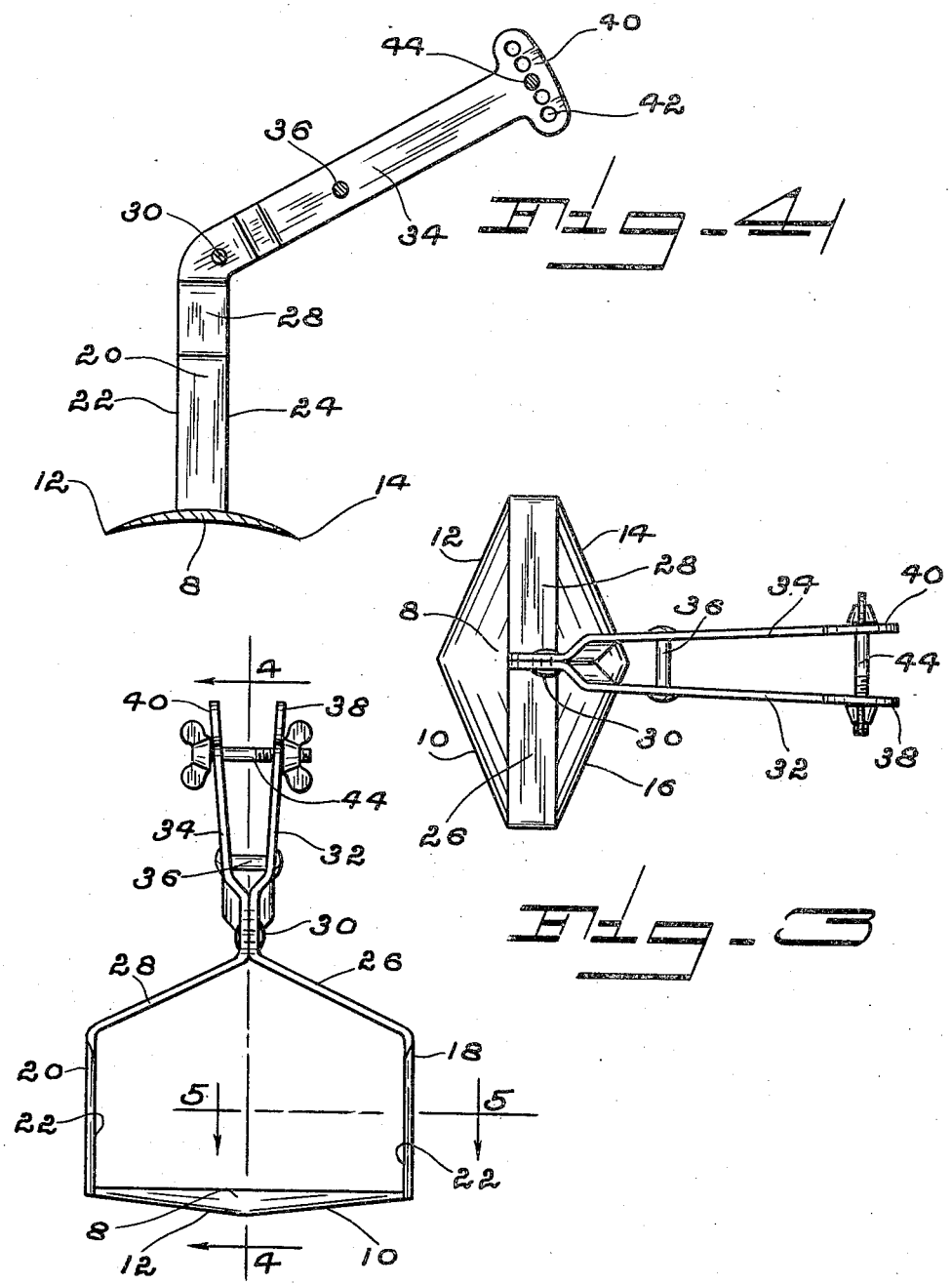

1,886,178

UNITED STATES PATENT OFFICE

CHARLES A. GODDARD, OF SEATTLE, WASHINGTON

SOIL CULTIVATOR

Application filed November 17, 1930. Serial No. 496,194.

My present invention relates to the art of gardening tools and more particularly to a soil cultivator.

Many devices have been created for hand tilling of soil such as garden tracts, nurseries and farm lands. Few have ever exceeded the old-fashioned hoe in all around usefulness. The principal cause of their inefficiency is due no doubt to the fact that two motions are required when they are used to loosen the soil; one, that of making the cultivating stroke and the other, (which is wasted effort,) that of restoring the implement to position for the next succeeding cultivating stroke. In my present device I have created an implement which works effectively when it is drawn to the operator and when it is pushed away from him. Thus, instead of losing, roughly, one-half of the applied effort, all the effort is directed to the process of cultivation. Further, with my device there is no waste effort, such as lifting the tool to an elevation necessary to strike the implement down to the ground to the depth necessary for the real cultivating operation. My tool further has the advantage of being self-sharpening, that is, as it is passed through the soil in reciprocating motions, the tendency is for the trailing edge to be sharpened by the soil in an amount equal to the dulling effect encountered by the leading edge; therefore The principal object of my invention is to provide a handy tool for thorough weeding and cultivation of soil with least possible friction between soil and tool; with the operation continuous without loss of motion, or energy required on the part of the operator and with the operator in the most easy erect position for the exercise of that energy required.

A further object is the provision of means for the cultivating and weeding of soil without moving the same from its desired position.

A further object is to provide a tool of the class described, wherein all the edges, in the direction of operating travel, are cutting edges, providing least possible resistance.

A further object is the production of a cultivating tool which makes it possible to work in places inaccessible to the more commonly used tools; for example, underneath shrub and plant foliage and on all sides of the plant with operator in one unchanged position.

A still further object is to provide a tool in which the reciprocating motion through the soil obviously creates a whetting action on the trailing edge of its members, especially that of the principal or main cutting blade. The creation of a tool for thorough performance of the act of cultivating and weeding at full length of the handle from the operator in all directions from one standing position, this feature permitting absolute freedom from necessity of tramping cultivated ground.

Other and more specific objects will be apparent from the following description taken in connection with the accompanying drawings, wherein Figure 1 is a perspective view showing my device with a handle, in place, which has been broken away.

Figure 2 is an end elevation of my device.

Figure 3 is a top plan view of my device.

Figure 4 is a vertical section taken along the line 4—4 of Figure 2.

Figure 5 is a horizontal sectional view taken along the line 5—5 of Figure 2.

Figure 6 is a vertical sectional view taken along the line 6—6 of Figure 5.

Referring to the drawings throughout which like reference characters indicate like parts, numeral 8 designates the main cutting blade of my device. This may, for use in light soil or soil in good state of tilth, be formed with a flat bottom and beveled edges beveling from the top down or, for heavier and more compact soil, I rather prefer to form it constructed along the line indicated in Figure 4, in which blade 8 has a curved lower surface. This enables me to produce a light tool of great penetrating ability and has the further advantage of providing alternately leading and trailing edges which, and in sequence, enable the operator to control depth of cultivation by elevation of handle in hand. In the form shown I have in effect 4 cutting edges as indicated by numerals 10, 12, 14, 16. Member 8 I have found will produce the most controllable penetrating and regulating quality when it has roughly the diamond shaped margin, as indicated.

Secured to each end of the diamond, and in actual practice formed of the same metal, are two vertical members 18 and 20. These I prefer to form with the cutting edges 22 and 24 to the end that they will offer less resistance when passed through the ground. These side members 18 and 20 have formed as an extension thereof the inwardly directed portions 26 and 28 which are joined together as by rivet 30. It will be apparent, I believe, that any form of securing would be satisfactory at this point, for instance an encircling strap might be used or the two members braised or welded together at this point. The strap-like members are further bent to form the handle engaging members 32 and 34. A rivet or bolt 36 is adapted to join these members together and to further form a pivot connection to the handle H. The handle engaging members terminate in quadrant-like ends 38 and 40. These are provided with a plurality of matching holes 42 which are adapted to receive the through bolt 44. As a matter of convenience I prefer to use a bolt having a large head, as for instance, the wing nut form shown and to supply the removable nut also of this form so that it will be very easy for the operator to change the adjustment of the handle. The adjustment would normally be changed only to suit the height of the operator if the implement were to be used only on level ground; however, when used on sloping ground, as terraces and the like, it is very desirable to have means for making this adjustment quickly and easily. Ordinarily a handle of usual rake handle length will be found the most satisfactory.

Under certain conditions I find it desirable to slot the end of handle H so that it can slip over the rivet 36. In this way a long handle can be very quickly substituted for a short one or vice versa, and thus make for easy adaptability to extreme close or distance operation.

Where soil is packed and hard, ease of penetration may be increased by increasing the curvature of the blade 8 and decreased for friable soil in good state of tilth.

*Method of operation*

In using my device it is necessary to first enter blade 8 into the ground by changing the normal angle of the handle. If the tool is being pulled towards the operator, the end of the handle should be slightly lowered. This will cause penetration desired through increased angle of cutting edges from the horizontal and at the same time provide whetting action upon the alternately trailing edges of blade in sliding contact with soil beneath. After the blade has reached the desired depth, cultivation is accomplished by a backward and forward movement. The depth can always be gauged on side members 18 and 20 and if it is found that because of the packing of the soil, the blade does not maintain uniform depth, it is only necessary to drop the handle end slightly as it is pulled towards the operator and raise it above normal slightly as it is pushed away. This will keep the tool at the desired depth.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

What I claim is:

1. A soil cultivator consisting of a horizontally disposed cutting blade having a diamond shaped contour and convex section across its minor axis; vertically disposed, double edged cutting blades secured to the ends of the diamond shaped blade; extensions of the vertical blades diverted inwardly until they meet, at which point they are turned in the plane of the minor axis of the blade and also twisted to form an acute angle with the horizontal; means for joining the extension together, and securing means for a handle.

2. A soil cultivator formed of a single piece of metal consisting of a horizontally disposed cutting blade having a diamond shaped contour and convex section across its minor axis; vertically disposed, double edged cutting blades secured to the ends of the diamond shaped blade; extensions of the vertical blades diverted inwardly until they meet, at which point they are turned in the plane of the minor axis of the blade and also twisted to form an acute angle with the horizontal; means for joining the extension together; a handle receiving V formed by diverging the extensions and securing means for a handle.

In witness whereof, I hereunto subscribe my name this 3rd day of October A. D. 1930.

CHARLES A. GODDARD.